June 30, 1936. H. HIGHAM 2,046,021
EYEGLASSES
Filed June 18, 1935
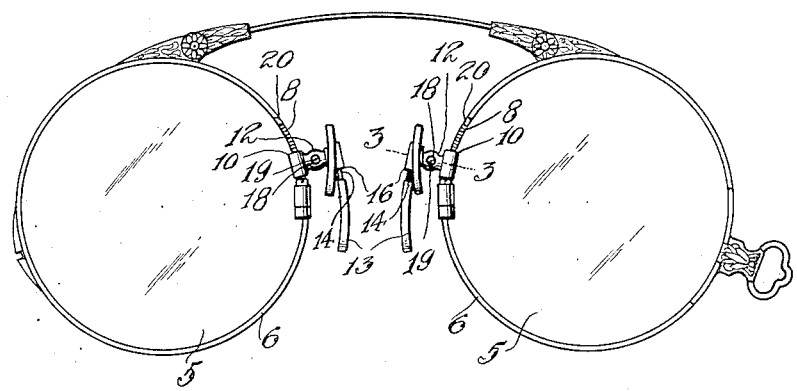
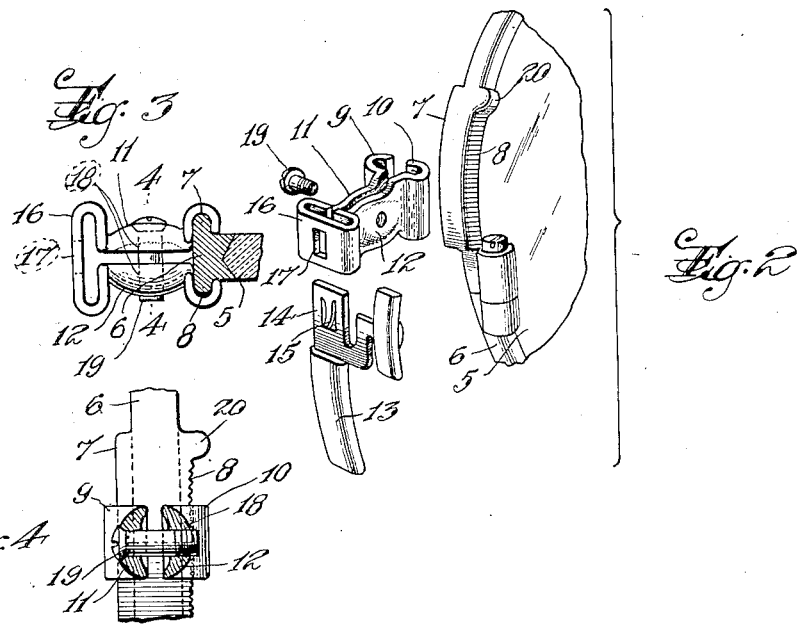
INVENTOR
Harry Higham
BY
ATTORNEY Patented June 30, 1936

2,046,021

UNITED STATES PATENT OFFICE 2,046,021

EYEGLASSES

Harry Higham, Maplewood Township, Essex County, N. J., assignor to Frank Krementz Company, Newark, N. J., a corporation of New Jersey Application June 18, 1935, Serial No. 27,204

5 Claims. (Cl. 88—42)

This invention relates to eyeglasses, and more particularly to means for adjustably positioning noseguards on eyeglasses.

Heretofore, eyeglasses have been manufactured with noseguards permanently mounted thereon; and it has been necessary to carry in stock eyeglass frames having noseguards mounted at various positions in order to accomodate the noses of different wearers. This has been objectionable in that it has been expensive to maintain frames with noseguards mounted at various positions, and in many instances an optician would find himself without a frame having noseguards mounted at the proper position to accommodate the nose of a particular wearer.

It is, therefore, an object of this invention to provide in eyeglasses, a frame having adjustably mounted thereon noseguard posts which can be readily positioned to accommodate the noses of different persons thereby eliminating the necessity of carrying in stock a plurality of different types of frames as above mentioned.

In accordance with my invention, there is provided on the eyeglass frame ribs having slidably mounted thereon a post for supporting a noseguard. When it is desired to position noseguards to properly accommodate the nose of a particular wearer, the noseguard posts can be moved on the ribs to the proper position and maintained in such a position.

A further object of my invention is the provision of means for adjustably positioning a post for supporting a noseguard without in any way necessitating alteration or adjustment of the noseguard itself.

These and other advantageous objects, which will later appear, are accomplished by the simple and practical construction and arrangement of parts hereinafter described and exhibited in the accompanying drawing, forming part hereof, and in which:

Fig. 1 is a plan view of eyeglasses embodying my invention,

Fig. 2 is an exploded view in perspective showing details of the invention,

Fig. 3 is a view taken on the line 3—3 of Fig. 1, and

Fig. 4 is a sectional view taken on the line 4—4 of Fig. 3.

Referring to the drawing, in Fig. 1 there is shown a pair of eyeglasses 5 each having a rim 6. The eyeglasses shown are of the Oxford or folding type; however, it is to be understood that my invention is not confined to that type of eyeglass but is adapted for use on other types of eyeglasses.

The rims 6 are provided with ribs 7 and 8 projecting laterally therefrom, the rib 8 being serrated as clearly shown in Fig. 2. The ribs 7 and 8 slidably receive channels 9 and 10 integral respectively with the walls 11 and 12 which form a post for supporting a noseguard 13. The noseguard 13 is provided with a tongue 14 having a prong 15 adapted to be positioned in the channel portion 16 formed by the walls 11 and 12, said portion 16 having a slot 17 to receive the prong 15 and maintain the noseguard in proper position. The walls 11 and 12 are provided with threaded apertures 18 to receive a threaded screw 19, for the purpose of clamping the walls together and at the same time clamping the channels to the ribs 7 and 8.

In operation, when it is desired to position a noseguard away from the center line of the eyeglasses, the screw 19 is loosened and the supporting posts formed by the walls 11 and 12 are slid upwardly on the ribs 7 and 8 and maintained in the final position by means of the serrations on the ribs 8, and the clamping action of the screw 19 in drawing the walls 11 and 12 together.

Movement of the channels 9 and 10 on the ribs 7 and 8 is limited by a stop 20 integral with and projecting from the rib 8.

From the above description it will be seen that I have provided a simple and relatively inexpensive structure for readily adjusting supporting posts and noseguards to accommodate eyeglasses for noses of various configurations.

An optician need only carry one type of eyeglass frame in stock when my adjustable noseguard supporting post is used, as the posts can be adjusted effectively from one to ten millimeters from the center lines of the eyeglasses. The adjustment can be made in the presence of the wearer so that the noseguards can be positioned to exactly and properly fit the nose of the wearer. This manner of adjustment is not only important from the standpoint of eliminating the necessity of carrying a plurality of different frames in stock having noseguards mounted in different positions from the center line, but it is also of great advantage in the accurate adjustment of eyeglasses to properly accommodate the eyes and nose of the wearer.

The foregoing disclosure is to be regarded as descriptive and illustrative only, and not as restrictive or limitative of the invention, of which obviously an embodiment may be constructed including many modifications, without departing from the general scope herein indicated and denoted in the appended claims.

Having thus described my invention, what I claim as new and desire to secure by Letters Patent, is:

1. In eyeglasses, a rim for supporting an eyeglass, ribs projecting laterally from a portion of said rim in opposite directions, a post comprising a strip of metal bent back upon itself to form a loop at one end and the free ends of said strip being bent to provide channels slidably embracing said ribs, one of said ribs being serrated along the edge thereof to enable step-by-step positioning of the post thereon, screw means passing through sections of the post to clamp said channels to the ribs at various positions of adjustment, and a noseguard detachably mounted in the loop of said post.

2. In eyeglasses, a rim for supporting an eyeglass, ribs projecting laterally from a portion of said rim in opposite directions, a post comprising a strip of metal bent back upon itself to form a loop at one end and the free ends of said strip being bent to provide channels slidably embracing said ribs, means for clamping said channels to the ribs at various positions of adjustment, and a noseguard detachably mounted in the loop of said post.

3. In eyeglasses, a rim for supporting an eyeglass, ribs projecting laterally from a portion of said rim in opposite directions, a post comprising a strip of metal bent back upon itself to form a loop at one end and the free ends of said strip being bent to provide channels slidably embracing said ribs, said ribs being serrated to enable the channels to be adjustably positioned thereon, means for maintaining said channels in adjusted positions on the rib, and a noseguard detachably mounted in the loop of said post.

4. In eyeglasses, a rim for supporting an eyeglass, ribs projecting laterally from a portion of said rim in opposite directions, a post comprising a strip of metal bent back upon itself to form a loop at one end and the free ends of said strip being bent to provide channels slidably embracing said ribs, said ribs being serrated to enable the channels to be adjustably positioned thereon, means for maintaining said channels in adjusted positions on the rib, a noseguard detachably mounted in the loop of said post, and a stop on one of said ribs to limit the sliding movement of the channels.

5. In eyeglasses, a rim for supporting an eyeglass, ribs projecting laterally from a portion of said rim in opposite direction, a post comprising a strip of metal bent back upon itself to form a loop at one end and the free ends of said strip being bent to provide channels slidably embracing said ribs, means for clamping said channels to the ribs at various positions of adjustment, a noseguard detachably mounted in the loop of said post, and a stop on one of said ribs to limit the movement of the channels in one direction.

HARRY HIGHAM.